United States Patent [19]
Fraga

[11] Patent Number: 5,662,028
[45] Date of Patent: Sep. 2, 1997

[54] APPARATUS FOR THE PREPARATION OF FOWL

[76] Inventor: Robert L. Fraga, 886 Cardoza, Tulare, Calif. 93274

[21] Appl. No.: 743,349

[22] Filed: Nov. 4, 1996

Related U.S. Application Data

[63] Continuation-in-part of Ser. No. 539,309, Oct. 4, 1995, Pat. No. 5,586,489.

[51] Int. Cl.$^6$ ............................ A47J 37/04; A22C 7/00
[52] U.S. Cl. ..................... 99/419; 99/421 H; 99/427; 99/442; 99/448
[58] Field of Search ................... 99/419–421 V, 99/427, 382, 442, 483, 343, 342; 219/523, 227, 530, 533, 540, 396, 407, 521, 385; 165/104.21, 185; 426/391, 497, 466, 523; 392/451, 459

[56] References Cited

U.S. PATENT DOCUMENTS

| | | |
|---|---|---|
| 1,802,532 | 4/1931 | Pulver ........................................ 426/391 |
| 1,979,501 | 11/1934 | Stepkin ..................................... 219/396 |
| 2,648,275 | 8/1953 | Thompson .................................. 99/419 |
| 2,918,561 | 12/1959 | Perez ........................................ 219/523 |
| 3,377,943 | 4/1968 | Martin ...................................... 99/419 |
| 3,635,146 | 1/1972 | Aubert ...................................... 99/339 |
| 3,709,141 | 1/1973 | Schwartzstein ............................ 99/343 |
| 3,899,657 | 8/1975 | Johnson .................................... 219/523 |
| 3,965,808 | 6/1976 | Chomette .................................. 99/419 |
| 3,980,010 | 9/1976 | Collinucci ................................. 99/421 H |
| 4,715,273 | 12/1987 | Riesselmann ............................. 99/442 |
| 4,810,856 | 3/1989 | Jovanovic .................................. 99/419 X |
| 5,301,602 | 4/1994 | Ryczek ...................................... 99/345 |

*Primary Examiner*—Timothy F. Simone
*Attorney, Agent, or Firm*—Dennis B. Haase

[57] ABSTRACT

An appliance for the preparation of fowl which has been dressed, comprising a heat transfer member having an exterior configuration which substantially conforms to the interior cavity of the dressed fowl and which, when inserted into the cavity, makes substantially total contact with the interior wall, the interior region of the heat transfer member defining a cavity, which cavity is heated to cooking temperature so that when said heat transfer member is disposed within a heated environment, the fowl is initially seared, both from within and on the outside, and thereafter quickly cooked for human consumption.

20 Claims, 2 Drawing Sheets

APPARATUS FOR THE PREPARATION OF FOWL

This is a continuation-in-part of my application, Ser. No. 08/539,309 filed Nov. 4, 1995, now U.S. Pat. No. 5,586,489 for IMPROVEMENTS IN THE METHOD AND APPARATUS FOR THE PREPARATION OF FOWL.

The present invention relates primarily, although not exclusively, to the commercial preparation of fowl, and more specifically to improvements in the apparatus disclosed in my copending application identified above, which permits a fully dressed bird to be rapidly and thoroughly cooked in a manner that enhances both flavor and appearance to the consumer, at a lower than expected cost.

BACKGROUND OF THE INVENTION

Field of the Invention

Since at least the mid to late '50s, America, indeed the world, has been fascinated with the concept of fast, when it comes to the preparation of food. Everyone is in a hurry, and few believe that they have time to chew their food, let alone sit down and enjoy it.

In the hustle and bustle of today's work-a-day world, highly significant commercial enterprises have been built around fast foods, and the franchise concept, properly operated, is a huge cash cow.

The hamburger was, and is, the all time leader in the fast food franchise trade for several reasons, not the least of which is its ability to be safely prepared in a very short period of time, and, of course, it is an American staple.

Chicken, also an American favorite, has been widely hailed by the health conscious as an alternative to the hamburger, but it has some draw backs, not the least of which is the length of time required, under ordinary circumstances, to prepare chicken so that it is cooked sufficiently to make it safe for human consumption.

In order to speed the cooking process, many commercial enterprises have developed, and exclusively employ, a pressure cooker with an oil cooking medium, into which chicken parts are placed, and which device literally forces hot oil into the meat for rapid penetration and cooking.

Several other commercial enterprises elect, for both aesthetic and flavor reasons, to prepare chicken whole, i.e., the fowl is dressed for cooking, and then cooked, without first sectioning the bird into its well know parts. Preparation typically takes place in a heated environment such as an oven of some sort, with convection ovens currently leading the way due to their even heat and intensity. However, chicken must, for health reasons, be thoroughly cooked, and that takes time . . . typically in the sixty minute range, and current state of the art devices for baking and roasting tend to be less efficient and somewhat slower than is desirable if the fast food market potential is to be optimized.

Indeed, commercial preparers are finding that the loss of moisture in current preparation methods has impaired commercial acceptance of the end product, and to counter the adverse effects of such losses, processors are now injecting chickens, for example with a fluid flavor enhancing medium, to replace, prospectively, that which is being lost in preparation. It is within this environment that the present invention has been developed.

It will be understood that, for purposes of this specification, the following definitions are intended to apply:

FOWL, shall mean any edible bird;

DRESSED FOWL, shall mean a fowl that has been fully prepared for cooking by the removal of feathers, pin feathers or the like, and the removal of all internal organs;

PREPARATION, shall mean the cooking, of the dressed fowl, whether by roasting, baking, or any other means or manner involving the application of heat, or any combination thereof.

OVERVIEW OF THE PRIOR ART

The concept which underscores the present invention is that of transmitting heat at cooking temperatures to the inside of the fowl, as well as to its outer surface simultaneously. That concept is not new, in and of itself, but as will be developed hereinafter, has been raised to a new, unique, and most importantly, a commercially acceptable level by the present invention.

An early effort, found in the patent art is represented in the Pulver U.S. Pat. No. 1,802,532, which really does not relate to the preparation of fowl at all, but rather the baking of biscuits, with an internal heating element.

The U.S. Pat. Nos. 5,301,602, to Ryczek, and 4,810,856, to Jovanovic, are representative of the thinking that moisture is important to the preparation of fowl, and both create moisture through the medium of steam applied internally to the bird.

Riesselmann U.S. Pat. No. 4,715,273 is yet another variation of the underlying theme. Riesselmann employs a simple heating element in the center of a rotary spit-type device. The heating element is disposed within the cavity of the dressed fowl and throws off heat to cook the bird both internally and externally. As will become apparent from a further reading of this specification, however, the Riesselmann effort is inefficient and ineffective to accomplish the objectives of the present invention.

Several other patented devices exist in the art, among them, U.S. Pat. Nos. 3,980,010, Collinucci, 2,918,561, Perez, 3,899,657 Johnson, and 1,979,501 Stepkin. These patent efforts, far from limiting the scope of the present invention, add emphasis to its novelty and commercial viability.

SUMMARY OF THE PRESENT INVENTION

The present invention embraces apparatus for preparing a fully dressed fowl, such as chicken, in a most efficient manner. More specifically, the present invention accomplishes the objectives attributable to it by rapidly sealing in juices within the cavity of the fowl being prepared, and thereafter delivering the appropriate heat, evenly distributed throughout the cavity surface. As a consequence, the fowl reaches the optimum and appropriate temperature in the thickest places, such as the breast, in the fastest time. Thus, the entire cooking process is facilitated, without sacrifice of flavor, to such an extent that the apparatus is sufficiently cost effective to be used in a fast food facility. The foregoing, of course, is a prime objective of the present invention.

Another objective of the present invention is to enhance the efficiency of the apparatus disclosed in my copending application to a great extent so that preparation of a fully dressed fowl for human consumption is accomplished by elevating the temperature of an entire fowl, inside and out, to the optimum cooking temperature, thereby completing the cooking process in minimal, cost effective time.

Yet another object of the present invention is to provide improved apparatus for preparing a fowl so as to preserve the maximum natural juices within the meat during the cooking process.

Another, and still further objective Of the present invention, is to provide apparatus for the preparation of a fully dressed fowl in the shortest possible time consistent with good health and culinary practices by employing higher temperatures, without scorching or otherwise damaging the surface of the fowl, making it unappetizing in appearance.

It is a specific objective of the present invention to provide means for raising the temperature within the fowl quickly, and uniformly, to a level consistent with the ambient temperature in the cooking environment in order that the cooking process be both uniform and rapid.

These and other objectives will become more apparent as the detailed specification of a preferred embodiment is read in conjunction with the drawings, wherein:

DESCRIPTION OF A PREFERRED EMBODIMENT

Figure 1:
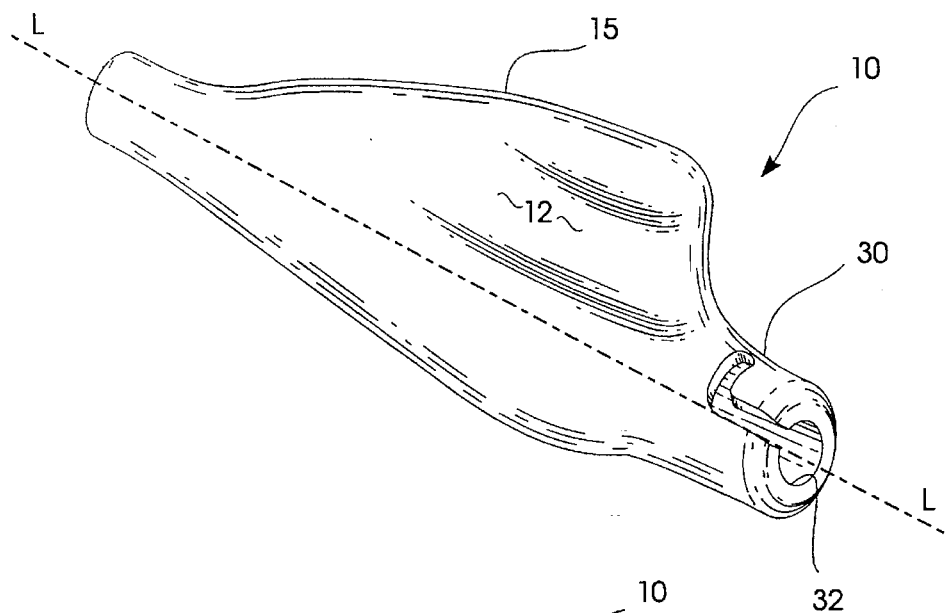
FIG. 1 is a perspective of a preferred embodiment of an improved appliance for the preparation of fowl, constructed in accordance with the present invention.

With reference initially to FIG. 1, an appliance, in the nature of a heat transfer member 10, which has been fashioned in accordance with the present invention, is depicted in perspective as it would appear prior to being inserted into a dressed fowl, F which is shown in FIG. 6, for preparation of the fowl for human consumption.

As referenced in the above-identified copending application, the shape of the appliance is expressly configured to fit snugly within the cavity of a fowl that has been dressed for cooking, which is, within some recognizable limits, essentially the same in most edible fowl. Obviously, however, the size may vary, and in some cases significantly, and an appliance 10 may be structured to accommodate such differences within the scope of the invention.

In keeping with the objectives of the invention, the heat transfer member 10 comprises an enlarged, bulbous element 12, which has a non-geometric peripheral heat transfer surface 15, that is also asymmetric about a longitudinal axis L—L passing through the center of the heat transfer member.

Figure 5:
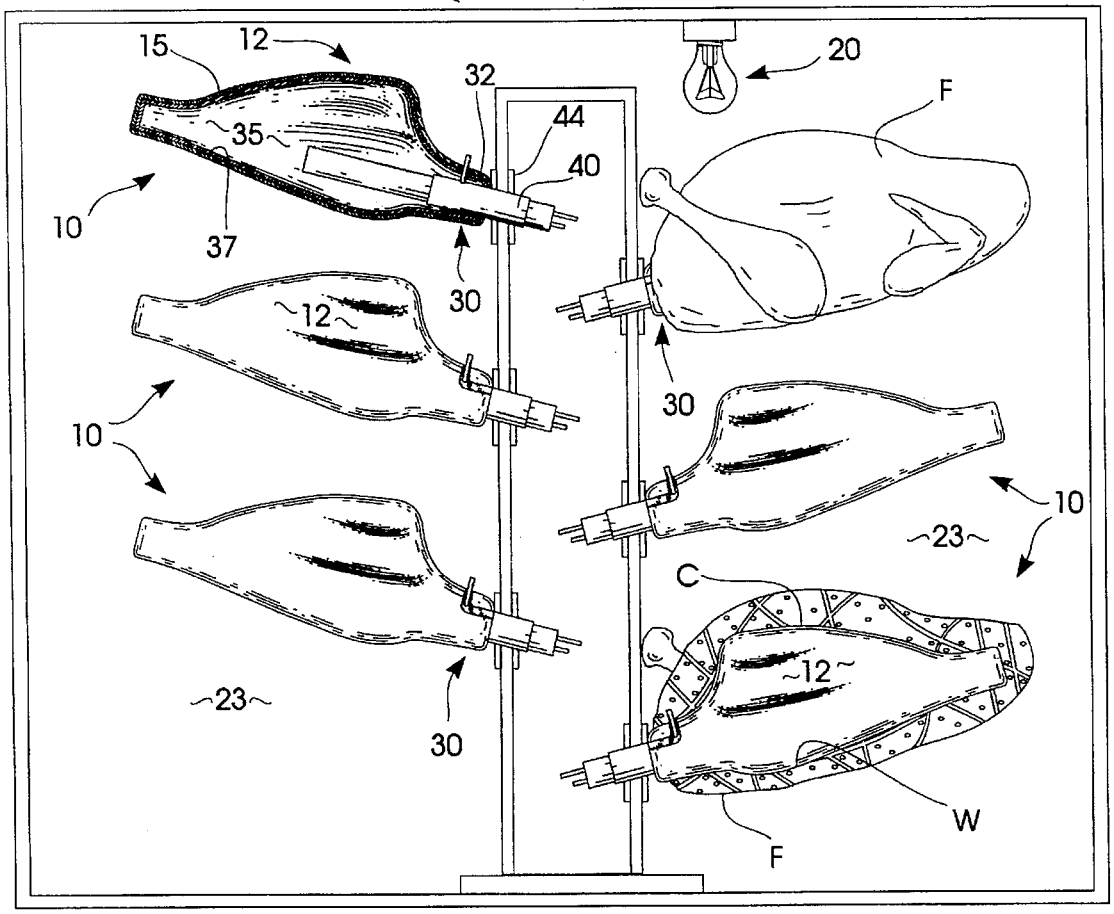
FIG. 5 is a pictorial representation of a multi unit food preparation device in which one or several fowl may be simultaneously prepared.

It is a significant feature of the present invention that, as depicted in FIG. 5, when the heat transfer member is inserted into the cavity of the fowl F, the entire surface 15 of the element 12 not only conforms to substantially all of the wall W of the cavity C, but actually contacts all of that wall, and, additionally, applies slight outward pressure to that wall. In this manner, and in accordance with this aspect of the invention, excellent heat transfer characteristics are achieved over substantially the entire area of contact between the wall of the cavity and the bulbous element 12.

Further in accordance with the invention, and in order to further enhance heat transfer, the heat transfer member 10 is constructed, or otherwise formed, of a heat conductive material. It has been found that the use of ceramics provides particularly good heat transfer characteristics, and despite the variations in thickness of the element 12, measured from its longitudinal axis, will provide excellent uniformity of temperatures at the surface 15, of the heat transfer member when heat is applied to it.

Having thus defined the interrelationship of the heat transfer member of the present invention, and a dressed fowl to be prepared, one need only place the heat transfer member in an appropriate heating environment, such as a convection oven O. It will be understood, however, that a variety of hearing environments are available, among them, radiant heaters and Conduction heaters.

Accordingly, and with reference to FIG. 5, such an exemplary environment is illustrated pictorially. An external heat source 20 is provided within an enclosure 23, defined within the oven O, to create a exemplary heating environment. It will be appreciated that the heat source may be partially or totally exposed to the fowl F, or may be concealed within the enclosure. The aforesaid pictorial representation is exemplary only of any one of several cooking environments, ranging from open pit to the most sophisticated of convection ovens.

In order to facilitate positioning of the fowl F and to secure the same in an appropriate attitude within the cooking environment, represented in FIG. 5, the depicted embodiment of the heat transfer member 10, of the present invention is provided with an extension 30. The extension 30 is preferably, and as a practical matter, integrally formed with the bulbous element 12, but it may also be separably formed and attached thereto without departure from the invention. The extension is preferably made of the same material as the body of the heat transfer member, however, irrespective of how it is attached, in order to provide Consistent heat transfer characteristics.

Figure 2:
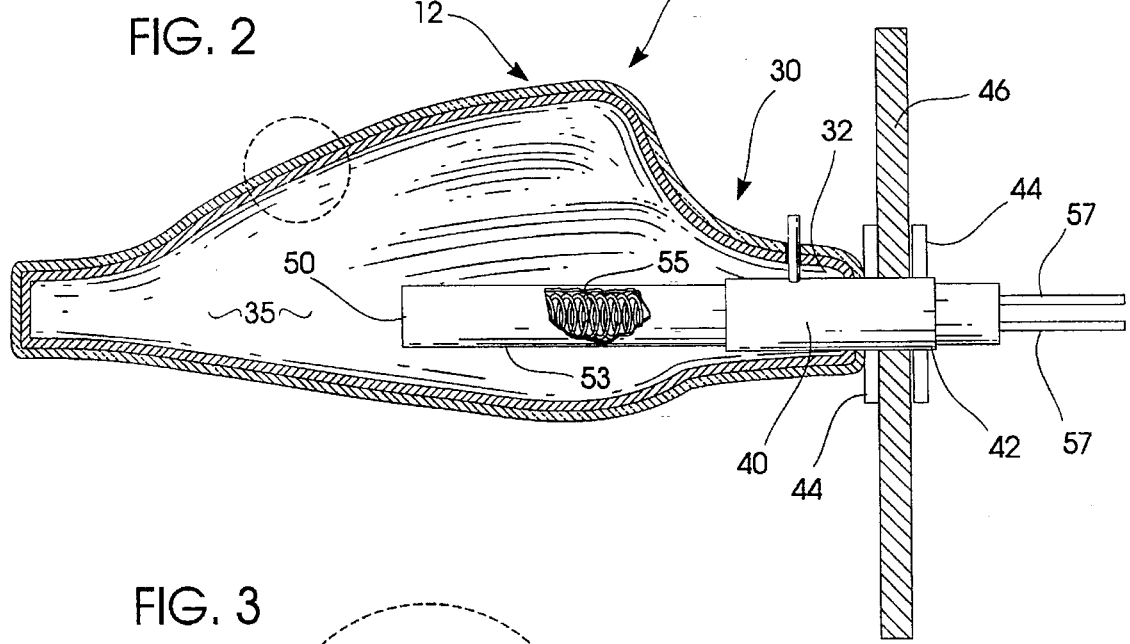
FIG. 2 is a side elevation of an appliance constructed in accordance with the present invention as illustrated in FIG. 1, shown as it would be mounted to a heat generating device, also constructed in accordance with the present invention, and sectioned to permit understanding of certain details of the internal construction.
Figure 4:
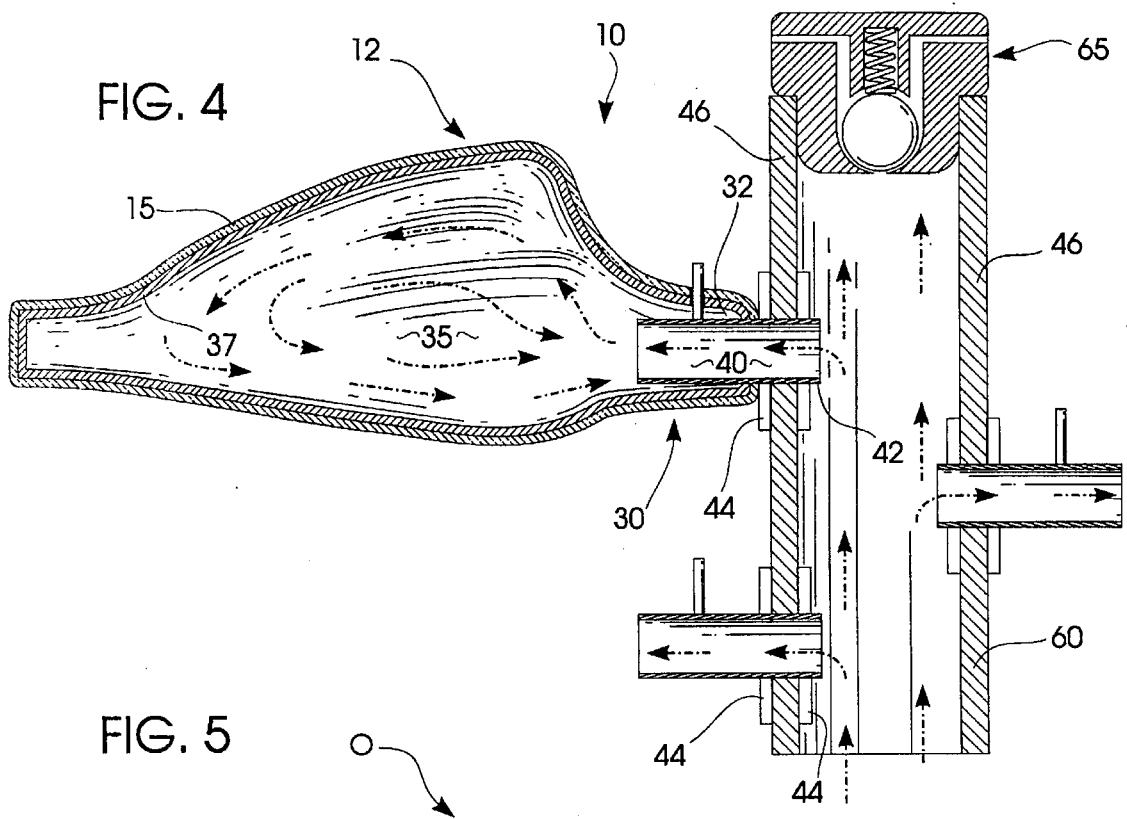
FIG. 4 is a side elevation similar to that of FIG. 2, but illustrating an embodiment of the present invention, in which heat is supplied to the appliance by a forced fluid induction system.

It is a significant feature of the present invention that the interior of the fowl is quickly heated to cooking temperature consistent with the environment within the enclosure 23. To this end, and as best seen in FIGS. 1, 2 and 4, the extension, or arm, 30 is formed with a passage 32 therethrough, which passage communicates with an interior cavity 35 formed in the heat transfer member 10.

Figure 3:
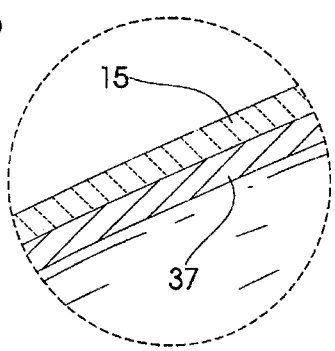
FIG. 3 is a macroscopic view of a cross section of the wall of the appliance of the present invention, taken from the circled area of FIG. 2, illustrating the layered wall structure of the appliance.

The interior wall of the cavity is preferably lined with a thin layer of highly heat conductive material, such as aluminum, in order to hasten the heating process, and assist in providing uniformity. Thus, such a lining 57 is affixed as seen in FIG. 3. Since such a layer makes the process of cleaning the heat transfer member very easy, it has additional value.

Yet another feature of the present invention is the provision of a heater within the heat transfer device in order to quickly and uniformly bring the heat transfer member to cooking temperature. In accordance with this important feature, and to accommodate a such a heat source for controlling the temperature of the heat transfer element 10 within the fowl, the cavity 35 and the connecting passage 32 in communication therewith, is adapted to receive a conduit 40. The conduit 40 serves, in accordance with this aspect of the invention, an initial purpose of positioning the fowl, upon an appliance, within the heating environment. To this end, the conduit 40 has an end 42 thereof secured in any well known manner, such as by threaded washers 44, to an upstanding support 46, disposed, at least in part, within the oven.

By virtue of the cavity 35 within the heat transfer element 10, one of several heat generating methods may be employed to raise and stabilize the temperature within the cavity 35 to an appropriate cooking temperature, all of which contemplate the introduction of a heater of some form into the internal cavity of the heat transfer device.

By way of illustration, FIG. 2 depicts the application of heat by means of an electro-thermal heater 50. The electrothermal unit 50 includes a casing 53, which houses a resistance coil 55, which fits into and is secured to the conduit 40. Since the conduit penetrates the abutment 46, it is a simple matter, by means of electrical leads 57, which connect the coil 55 to a power source, not specifically illustrated, since many such sources are available, to cause the unit 50 to generate heat at a predetermined temperature, thereby heating the medium, typically air, within the cavity 35, which will, in turn, cause the surface 15 of the bulbous element 12 to quickly rise to, and remain at, cooking temperature. In keeping with the objectives of the invention, sufficient heat is generated to effect an initial searing of the interior wall of the cavity is accomplished, and, as a consequence, juices from the meat of the fowl F, which would otherwise be forced into the cavity by the application of heat to the exterior surface of the fowl, are sealed in, along with the flavor which those juices represent to the consumer.

In the embodiment of FIG. 4, a different heater is employed. Thus, the conduit 40 provides communication between a source of heated fluid medium, such as air, and the cavity 35 of the heat transfer element 10. The abutment to which the conduit is affixed is, in this instance, a standpipe 60, through which the heated medium flows to the various appliances affixed thereto, as seen if FIG. 5. Again, the heat source is not specifically illustrated since there are a number of such sources that will suffice without departure from the invention. A safety valve 65 is provided to permit relief for excess pressure buildup.

As can readily be appreciated from the forgoing description, the appliance of my copending application provided an efficient way of preparing fowl in rapid fashion by preheating the heat transfer member 10, and thereafter relying on maintenance of the temperature of the heat transfer element 10 at cooking temperatures essentially by conduction of heat through the extensions 30 and 32 from the cooking environment.

The present invention provides an even more efficient way of maintaining heat in the heat transfer element 10 by direct application of heat to the internal area, and thus the walls of the heat transfer element. In so doing, uniformity of heat transfer is virtually assured, and cooking times are enhanced to a greater extent than heretofore thought possible.

It will now be apparent that the heat transfer member of the present invention has both practical and esthetic uses, in either a home or commercial environment, and that the end product is a more thoroughly prepared, and flavorful, and palatable food stuff.

Having thus described a preferred embodiment of the present invention, what is claimed is:

1. An appliance for the preparation of fowl which has been dressed out in such a manner as to leave an interior cavity defined by an interior wall, comprising:

a heat transfer member; said heat transfer member having a longitudinal axis; and further including a bulbous element formed about said longitudinal axis in asymmetrical fashion such that the bulbous element is formed with an exterior surface defining a shape which substantially conforms to the shape of the interior cavity of the fowl, said exterior surface of said heat transfer member adapted to make heat transfer contact with substantially all of the interior wall of the cavity of the fowl, said heat transfer member additionally having an internal cavity defined therein, means defining a heater, said heater being in communication with the internal cavity of said heat transfer member and adapted to uniformly heat said heat transfer member to cooking temperature.

2. An appliance as set forth in claim 1, wherein said bulbous element is formed of a ceramic heat transfer material.

3. An appliance as set forth in claim 1, wherein said internal cavity of said heat transfer member is lined with a uniform layer of material having high heat conductivity.

4. An appliance as set forth in claim 3, wherein said uniform layer of material is aluminum.

5. An appliance as set forth in claim 1, wherein said appliance is disposed within a heated environment.

6. An appliance as set forth in claim 1, wherein said bulbous element is provided with an extension along the longitudinal axis thereof; said extension having a passage formed therein, said passage being in communication with said interior cavity of said heat transfer member, and said heater provides heat, at cooking temperatures within said cavity.

7. The appliance as set forth in claim 1, wherein said heater comprises an electro thermal device.

8. The appliance as set forth in claim 7, wherein said heater comprising a forced air device for engulfing said cavity in air preheated to cooking temperatures.

9. The appliance as set forth in claim 5, wherein means is disposed in said heated environment means and attached to said heat transfer member for rotating the same.

10. The appliance as set forth in claim 2, wherein said internal cavity of said heat transfer member is lined with a uniform layer of material having high heat conductivity.

11. The appliance as set forth in claim 2, wherein said appliance is disposed within a heated environment.

12. The appliance as set forth in claim 3, wherein said appliance is disposed within a heated environment.

13. The appliance as set forth in claim 2, wherein said bulbous element is provided with an extension along the longitudinal axis thereof; said extension having a passage formed therein, said passage being in communication with said interior cavity of said heat transfer member, and said heater provides heat, at cooking temperatures within said cavity.

14. The appliance as set forth in claim 3, wherein said bulbous element is provided with an extension along the longitudinal axis thereof; said extension having a passage formed therein, said passage being in communication with said interior cavity of said heat transfer member, and said heater provides heat, at cooking temperatures within said cavity.

15. The appliance as set forth in claim 2, wherein said heater comprises an electro-thermal device.

16. The appliance as set forth in claim 2, wherein said heater comprises a forced air device for engulfing said cavity in air preheated to cooking temperatures.

17. The appliance as set forth in claim 3, wherein said heater comprises an electro-thermal device.

18. The appliance as set forth in claim 3, wherein said heater comprises a forced air device for engulfing said cavity in air preheated to cooking temperatures.

19. The appliance as set forth in claim 6, wherein said heater comprises an electro-thermal device.

20. The appliance as set forth in claim 6, wherein said heater comprises a forced air device for engulfing said cavity in air preheated to cooking temperatures.

* * * * *